(12) United States Patent
Dultz et al.

(10) Patent No.: US 7,003,665 B1
(45) Date of Patent: Feb. 21, 2006

(54) METHOD FOR THE SECURE TRANSMISSION OF MESSAGES

(75) Inventors: Wolfgang Dultz, Frankfurt (DE); Eric Hildebrandt, Frankfurt (DE); Heidrun Schmitzer, Regensburg (DE); Gisela Dultz, Frankfurt (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/315,901

(22) Filed: May 20, 1999

(30) Foreign Application Priority Data

May 20, 1998 (DE) ................................ 198 22 685

(51) Int. Cl.
*H04L 9/00* (2006.01)
*H04K 1/00* (2006.01)

(52) U.S. Cl. ........................ 713/172; 380/44; 380/255; 380/259

(58) Field of Classification Search ................. 380/37, 380/42, 259, 260, 277–279, 255–257, 264, 380/44, 54, 243, 244; 713/151, 168, 171, 713/182, 172, 185; 705/65, 76, 77
See application file for complete search history.

(56) References Cited

U.S. PATENT DOCUMENTS

| | | | |
|---|---|---|---|
| 4,933,969 A | | 6/1990 | Marshall et al. |
| 5,109,152 A | * | 4/1992 | Takagi et al. ............... 235/380 |
| 5,227,613 A | | 7/1993 | Takagi et al. |
| 5,307,410 A | | 4/1994 | Bennett |
| 5,307,411 A | | 4/1994 | Anvret et al. |
| 5,778,069 A | * | 7/1998 | Thomlinson et al. ......... 380/25 |
| 5,778,072 A | * | 7/1998 | Samar ........................ 380/30 |
| 6,014,445 A | * | 1/2000 | Kohda et al. ................. 380/28 |
| 6,052,466 A | * | 4/2000 | Wright ....................... 380/262 |
| 6,052,786 A | * | 4/2000 | Tsuchida .................... 713/201 |
| 6,128,386 A | * | 10/2000 | Satterfield ..................... 380/28 |
| 6,389,403 B1 | * | 5/2002 | Dorak, Jr. .................... 705/52 |
| 6,496,928 B1 | * | 12/2002 | Deo et al. ................... 713/153 |

FOREIGN PATENT DOCUMENTS

| | | |
|---|---|---|
| DE | 31 23 167 | 2/1983 |
| DE | 33 40 582 | 5/1985 |

(Continued)

OTHER PUBLICATIONS

Schneier, "Applied Cryptography" 1996, John Wiley & Sons, Inc., 2nd Edition, p 197-99,202,203.*

(Continued)

*Primary Examiner*—Ayaz Sheikh
*Assistant Examiner*—Christopher Revak
(74) *Attorney, Agent, or Firm*—Kenyon & Kenyon

(57) ABSTRACT

A method and system for the secure transmission of messages between at least two users of a telecommunications network, using a secret, random binary encryption key, which is used once for encryption. The key is generated in a key generator recorded on at least two portable data media, such as CDs, and then output in this form to the users, each of whom receives one data medium containing the recorded key. The key is not stored in any other location. The users insert the recorded key media into reading devices, which are respectively assigned to telecommunications equipment, e.g., telephones, fax machines, or PCs, employed by the users. When a connection is established, logistics devices, which are also assigned to the telecommunications equipment, check whether the keys were entered properly and whether they correspond to each other. The logistics devices also synchronize the entered keys, or at least portions of the keys, when the information to be transmitted is encrypted and decrypted.

20 Claims, 2 Drawing Sheets

FOREIGN PATENT DOCUMENTS

| | | | |
|---|---|---|---|
| DE | 196 41 754 A1 | | 4/1998 |
| DE | 694 08 176 | | 7/1998 |
| WO | WO 87/05175 | | 8/1987 |
| WO | WO 00/46954 | * | 8/2000 |

OTHER PUBLICATIONS

Menezes et al, "Handbook of Applied Cryptography" 1997, CRC Press, p. 171-173.*

* cited by examiner

METHOD FOR THE SECURE TRANSMISSION OF MESSAGES

FIELD OF THE INVENTION

The present invention relates to a method and encryption system for the secure transmission of messages between at least two users of a telecommunications network.

RELATED TECHNOLOGY

Because computers have penetrated nearly every aspect of life and there is an increasing trend toward networking them in extensive telecommunications networks, the stream of data traffic between a wide variety of computers has grown enormously. Much of the information exchanged is confidential and must and/or should be protected against access by unauthorized third parties, which means there is a great need for cryptographic means of securing this data traffic. Simple cryptographic methods, however, are no match for cryptographic analysis using computers, giving rise to enormous interest in encryption methods that provide security even when computers with new kinds of decryption methods are used.

The same is also true when exchanging information over the telephone or between fax machines, since the use of the latest computer technology, combined with automatic word recognition techniques, makes it possible, in business as well as personal environments, to easily record, find at a later time, and evaluate practically any word sent over public transmission channels. In non-business applications, at least, people are practically defenseless at the moment against this type of intervention into their private lives, since they lack adequate access to the necessary encryption and decryption methods as well as apparatus required for carrying out these methods. In addition, a large portion of the known encryption methods that are usually considered to be relatively secure allow unauthorized third parties to gain access to the information exchanged by using very powerful computers and/or new types of decryption methods. This could theoretically also result through government seizure of the keys used.

The only encryption methods that are presently considered to be absolutely secure against computer-based decryption attempts are those in which the sender and recipient of a message both use the same secret, random key, which is the same length as the message itself and is used only once for encrypting the message.

SUMMARY OF THE INVENTION

It is therefore an object of the present invention to provide a method for individually generating secret, random keys of this type and for exchanging the generated keys between at least two users of a telecommunications network in order to encrypt information exchanged over the telephone, by fax or PC in a way that ensures its privacy. It is also an object of the present invention to provide an encryption system for carrying out this method using the corresponding technical equipment.

The present invention provides a method for the secure transmission of messages between at least two users of a telecommunications network, including the following steps:
a) a secret, random binary key of a great length is generated by a key generator (10);
b) this key is recorded on at least two portable data media (12), and these data media (12) are output by the key generator (10), with the users each receiving one data medium (12) containing the key;
c) these data media (12) are inserted into reading devices (14) which are each assigned to telecommunications equipment (16) employed by the users for message transmission, and the keys recorded on the data media (12) are read by the reading devices (14);
d) a connection is set up between the telecommunications equipment (16) employed by the users for message transmission;
e) proper insertion of the data media is checked and the read-in keys compared by logistics devices (18) which are respectively assigned to the telecommunications equipment (16) employed by the users for message transmission;
f) if the keys match, the messages to be transmitted are encrypted using at least one portion of the key.

The present invention also provides an encryption system for carrying out a method for the secure transmission of messages between at least two users of a telecommunications network, characterized by
at least one key generator (10) having a device for generating a random, binary key of a great length, a device for recording the generated key on at least two portable data media (12), and a device for outputting the recorded data media (12);
at least two reading devices (14) for reading the key from the recorded data media (12), with the reading devices (14) being assigned to the telecommunications equipment (16) employed by the users for message transmission;
at least two logistics devices (18) for checking the proper insertion of the data media and for comparing the read-in keys, with the logistics devices (18) respectively being assigned to the telecommunications equipment (16) employed by the users for message transmission; and
at least two encryption and/or decryption devices for encrypting and/or decrypting messages to be transmitted or received, using at least one portion of the read-in key if the keys match, with the encryption and/or decryption devices respectively being assigned to the telecommunications equipment (16) employed by the users for message transmission.

BRIEF DESCRIPTION OF THE DRAWINGS

Special features and advantages of an encryption method according to the present invention, an encryption system according to the present invention for carrying out this method, and the corresponding technical equipment of this system are explained in the following detailed description of an exemplary embodiment, based on the drawings, in which.

DETAILED DESCRIPTION

Figure 1:
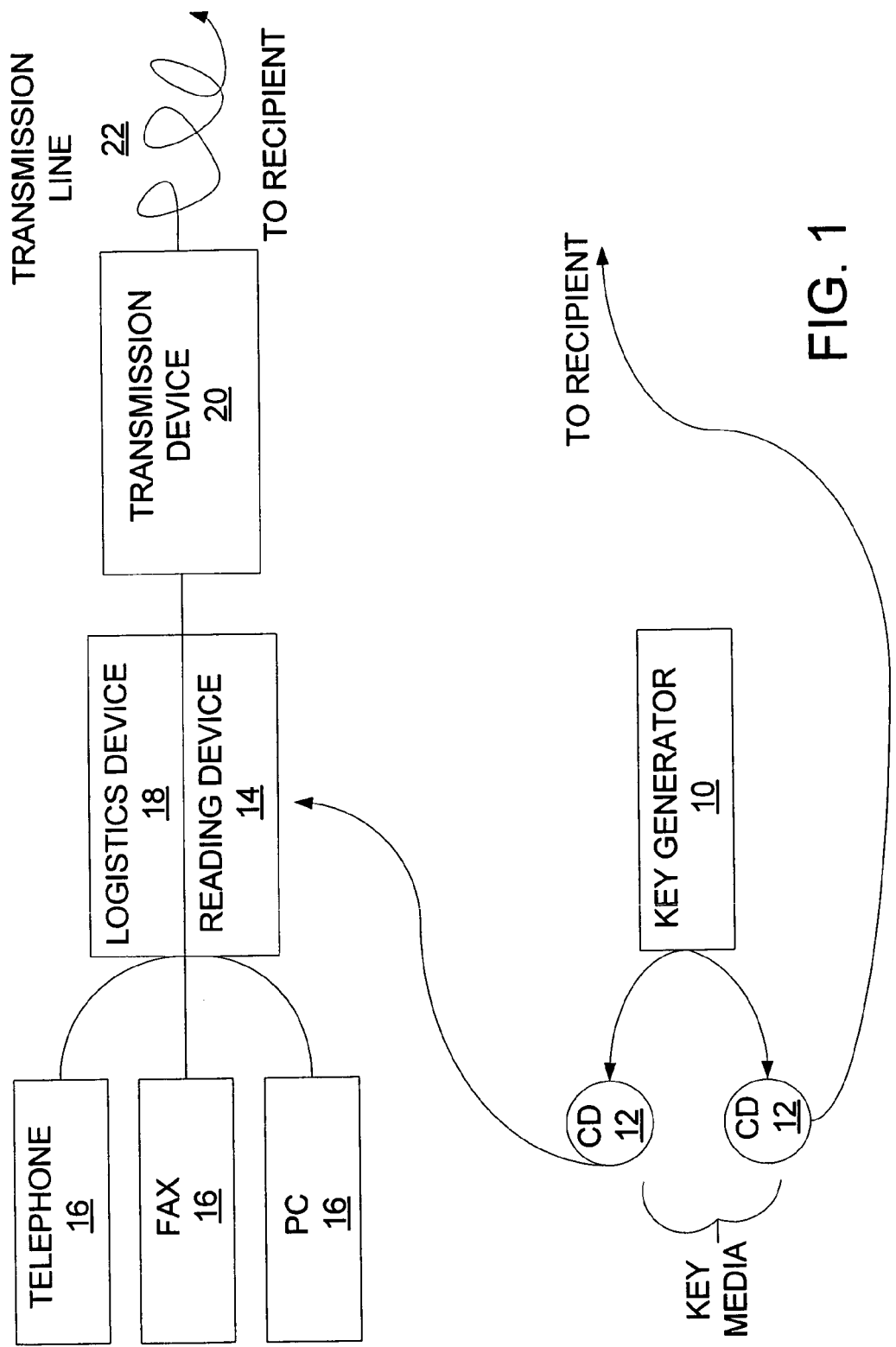
FIG. 1 shows a schematic depiction of an encryption system according to an embodiment of the present invention.

FIG. 1 shows a key generator 10 for generating a random binary key of a great length (FIG. 2 block 102) which, in the present embodiment, is produced by a built-in optical random number generator with a beam splitter (not shown), like the one described in German Patent Application No. 196 41 754.6, which is hereby incorporated by reference herein.

However, it is also possible to use a random number generator in which the spontaneous emission of a photon in electrically or optically excited matter or radioactive decay is used for generating the key. The use of a physical noise-generating process or another suitable physical process is also conceivable.

The generated key is then recorded, without being stored internally, on at least two portable data or key media 12 by a recording device (not shown) built into key generator 10 and output in this form to a user (FIG. 2 block 104), with the user being able to freely select the number and possibly also the type of data media output using an input keyboard (not shown). As in the present embodiment, CDs can be used as data media 12. However, the key can also be stored and output on devices such as magnetic tapes, suitable semiconductor storage devices, or another type of suitable, portable storage device.

Key generator 10 is accessible to the public in order to enable a broad segment of the population to secure their communications connections through cryptographic means. As many key generators 10 as possible should therefore be installed over a wide area, making sure that the location where devices 10 are installed has support personnel and enjoys a certain amount of public trust, as is the case, for example, with the post office. By doing this, the danger of devices 10 being manipulated or the likelihood of the key falling into the hands of unauthorized third parties who can assign the key to a specific person is relatively low.

It is relatively easy to activate key generators 10, preferably by inserting a coin or another means of payment such as a magnetic strip card, without the user having to provide identification, or without any data on the magnetic strip card being stored. This further increases anonymity in issuing the keys, and thus the security of the encryption method.

However, it is also conceivable for large companies to encrypt, in the specified manner, all of their communications traffic with a recipient, such as a subsidiary or branch establishment, possibly in combination with dedicated lines. In this case, it would be worthwhile to use a separate key generator 10 that is installed in the company and is accessible to the employees of that company or to only a limited group of selected people, who, for security reasons, may have to first identify themselves by entering a personal secret number.

In light of enormous technological advances, it is also conceivable, however, that key generators 10 of the specified type can be produced so economically and with such compact dimensions in the future that they will be affordable even for private consumers, with large numbers of them even being found in private households.

Using an input keyboard (not shown), the number of specified data media 12 can be selected so that it corresponds to the number of users communicating with each other. If there is one sender and one recipient, therefore, two data media 12 are output, with the same random key being recorded on each one and with the sender and the recipient each receiving one of these data media 12. Data media 12 can also be transferred, for example, in person or by sending them through the mail. The exchange of keys can also be made more secure by using a suitable key distribution system like the one known to those skilled in the art of encryption, for example, under the designation "quantum cryptography".

Figure 2:
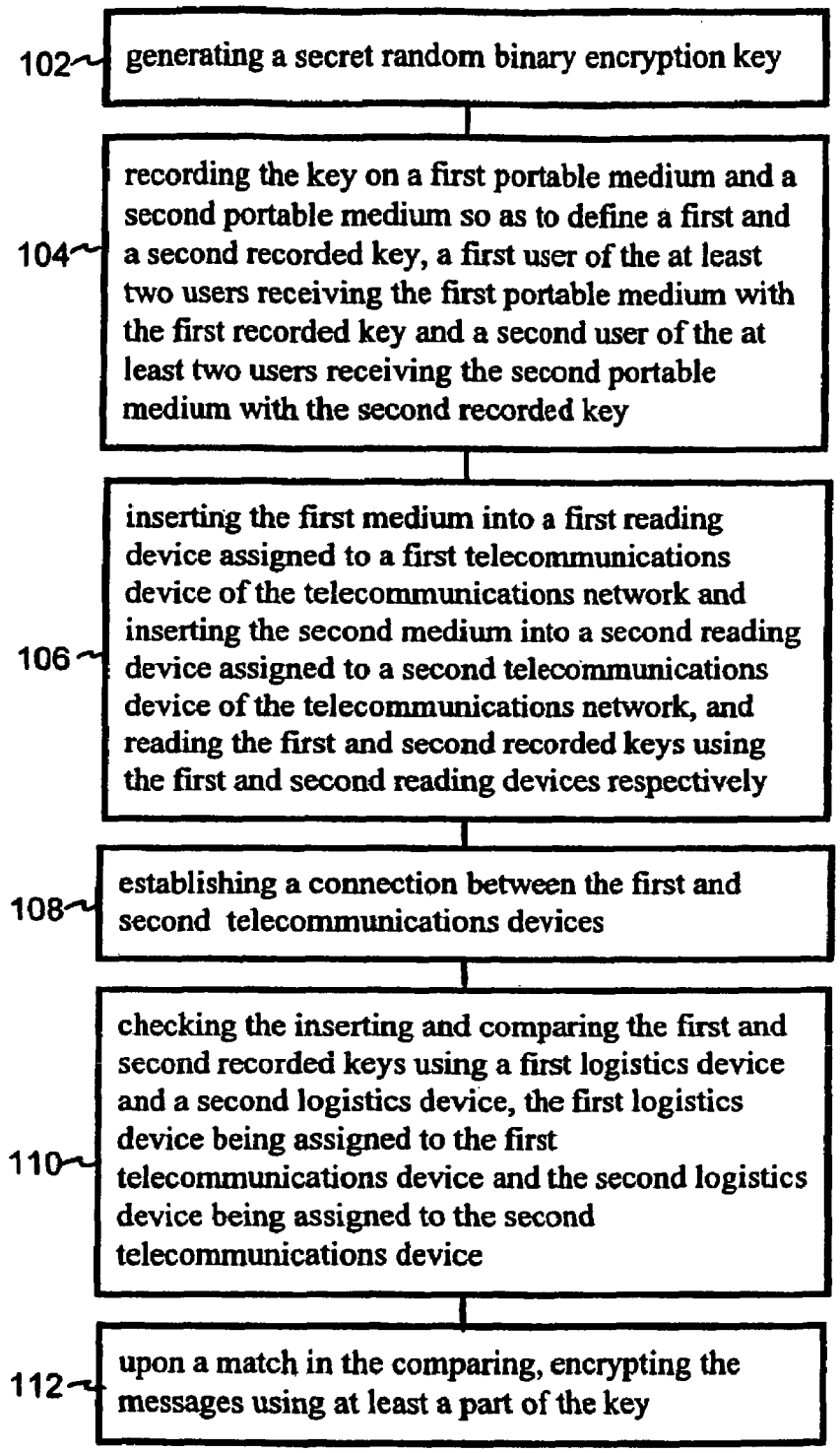
FIG. 2 shows a flow chart of an encryption method according to the present invention.

To encrypt a message, the users insert data media 12 into reading devices 14 which are assigned to telecommunications equipment 16, such as telephones, fax machines, or PCs, employed by the users (i.e., the sender of a message and the corresponding recipient of the message) for message transmission and which are used to read the implemented key from the data media (FIG. 2 block 106).

Logistics devices 18, which are also assigned to the telecommunications equipment 16 used for message transmission and which contact each other automatically when a connection is set up (FIG. 2 block 108), are used to check whether the key has been entered properly and whether the keys entered by the users correspond to each other (FIG. 2 block 110). If the keys match, encryption may take place (FIG. 2 block 112).

When a message is encrypted or decrypted, logistics devices 18 also synchronize the sender and recipient keys, or portions of these keys, and ensure that only the as yet unused portions of the random key on key media 12 are used for encryption. This is done, for example, by deleting the used portions of a key, rendering them unusable, or storing the location on the data medium that marks the end of the used portion of the key.

A binary message to be transmitted is easily encrypted, for example, by adding the key in the form of a binary code to the message (modulo 2) and subsequently transmitting the resulting random number sequence from an assigned transmission device 20 to the corresponding recipient via a transmission line 22. The random key is then subtracted from incoming encrypted messages, thus decrypting the message. The message can then be supplied to the telephone, fax machine, or other device of the recipient. After an entire key has been used up, a new key, which does not match any other key and can also be used only once, can be obtained from any key generator 10.

Reading device 14 and logistics device 18 can be designed in a very compact and light-weight format so that they can be used separately as well as integrated into a combined device, even in portable handsets, which greatly expands the range of applications for a method according to the present invention.

In two-way calls over the telephone, encryption and transmission as well as decryption must take place during the call and during pauses in the conversation, which means that buffers may have to be provided in order to collect portions of the message prior to transmission. However, these individual components are already necessary for normal transmission and encryption as well as for reading and recording messages.

If a sender of messages would like to correspond privately with multiple recipients, he can use a separate key for each of these connections, with this key being again recorded on two identical data media 12 and the sender and recipient each receiving one data medium 12. To maintain order in this case, various data media 12 containing the keys can be inserted into an apparatus which assigns the individual keys to the selected recipients. It includes a holding device for various key media 12 and, when a connection is set up, automatically selects the correct one containing the same key as the one assigned to the selected recipient. If the key media are CDs, the apparatus resembles the CD changer of a CD player. The individual keys can be assigned either manually by the user or by a logistics device in the apparatus itself, which, prior to setting up a connection, contacts the corresponding logistics device of a recipient, checks the inserted key medium or key, and automatically selects the correct key medium or key. Once again, the keys are read from key media 12 using an integrated reading device.

It is also conceivable for both the recipient and the sender to have an apparatus in which multiple data media 12 containing keys are inserted so that the media can be processed either consecutively in a permanently specified order or in a random order determined by the sender's logistics device, which then contacts the corresponding logistics device of the recipient in order for a data medium containing the same key to be inserted at the receiving end.

Because the random keys in the method according to the present invention are recorded only on key media 12, are not known to transmission and reading devices 20 and 14, and are also used only once for encrypting a message, it is practically impossible for unauthorized third parties to break the code even when using very powerful computers and the latest encryption methods, as long as key media 12 containing the keys do not fall into the hands of unauthorized persons, which is relatively easy to prevent by taking suitable precautionary measures.

What is claimed is:

1. A method for secure transmission of messages between at least two users of telecommunications network, the method comprising:

providing a secret random binary encryption key provided by a key generator;

recording the secret random binary encryption key on a first portable medium and a second portable medium so as to define a first and a second recorded key, a first user of the at least two users receiving the first portable medium with the first recorded key and a second user of the at least two users receiving the second portable medium with the second recorded key;

inserting the first medium into a first reading device assigned to a first telecommunications device of the telecommunications network and inserting the second medium into a second reading device assigned to a second telecommunications device of the telecommunications network, and reading the first and second recorded keys using the first and second reading devices respectively;

establishing a connection between the first and second telecommunications devices;

checking the inserting and comparing the first and second recorded keys using a first logistics device and a second logistics device, the first logistics device being assigned to the first telecommunications device and the second logistics device being assigned to the second telecommunications device; and upon a match in the comparing, encrypting the messages using at least a part of the secret random binary encryption key.

2. The method as recited in claim 1 wherein the reading the first and second recorded keys defines a first read key and a second read key respectively, and further comprising:

synchronizing the first and second read keys or parts of the first and second read keys using the first and second logistics devices respectively so as to encrypt and decrypt the messages.

3. The method as recited in claim 1 further comprising:

generating a plurality of additional secret random binary encryption keys using the key generator;

recording each of the plurality of additional secret random binary encryption keys on the first portable medium so as to define a plurality of additional recorded keys, each of the additional recorded keys being assigned to a respective connection between the first user and a respective other user of the at least two users;

inserting the first medium into the first reading device or another device assigned to the first telecommunications device;

selecting the assigned respective additional recorded key using the first reading device or the other device upon an establishing of the respective connection; and encrypting the messages corresponding to the first user and the respective other user using the assigned respective additional recorded key.

4. The method as recited in claim 1 wherein an optical random number generator with a beam splitter is used for the generating.

5. The method as recited in claim 1 wherein a spontaneous emission of a photon in electrically or optically excited matter is used for the generating.

6. The method as recited in claim 1 wherein a physical noise-production process or a radioactive decay is used for the generating.

7. The method as recited in claim 1 wherein the first recorded key is recorded only on the first and second portable media.

8. The method as recited in claim 1 wherein the first and second portable media include at least one of a magnetic tape, a CD, and a suitable semiconductor storage device.

9. The method as recited in claim 1 further comprising additional portable media and wherein a number and/or type of the additional portable media is freely selectable.

10. The method as recited in claim 1 where the key generator is accessible to a public.

11. The method as recited in claim 1 further comprising activating the key generator by inserting a payment device or a magnetic strip card.

12. The method as recited in claim 1 wherein the secret random binary encryption key or parts of the secret random binary encryption key, is used only once.

13. An encryption system for secure transmission of messages between at least two users of a telecommunications network, the encryption system comprising:

a key generator for generating a random binary encryption key;

a recording device for recording the random binary encryption key on a first portable medium and a second portable medium so as to define a first and a second recorded key respectively;

a first reading device and a second reading device, the first and second reading devices for reading the first and second recorded keys respectively, the first reading device assigned to a first telecommunications device of the telecommunications network and the second reading device assigned to a second telecommunications device of the telecommunications network;

a first logistics device assigned to the first telecommunications device and a second logistics device assigned to the second telecommunications device, the first and second logistics devices for checking proper insertion of the first and second media in the first and second reading devices respectively, and for comparing the first and second recorded keys so as to seek a match; and a first encryption and/or decryption device assigned to the first telecommunications device and a second encryption and/or decryption device assigned to the second telecommunications device, the first and second encryption and/or decryption devices for encrypting and/or decrypting the messages using a least a part of the random binary encryption key if the first and second logistics devices determine a match.

14. The encryption system as recited in claim 13 wherein the reading the first and second recorded keys defines a first read key and a second read key respectively, and wherein the first and second logistics devices are capable of synchronizing the first and second read keys or parts of the first and second read keys.

15. The encryption system as recited in claim 13 wherein the key generator includes an optical random number generator having a beam splitter.

16. The encryption system as recited in claim 13 wherein the key generator includes a random number generator using a spontaneous emission of photons in electrically or optically excited matter.

17. The encryption system as recited in claim 13 wherein the key generator includes a random number generator using a physical noise-generating process or a radioactive decay.

18. The encryption system as recited in claim 13 further comprising additional portable media and wherein the key generator includes an input keyboard for entering a desired number and/or a type of additional portable media.

19. The encryption system as recited in claim 13 wherein at least one of the first and second reading devices is capable of reading a plurality of additional random binary encryption keys, each of the plurality of additional random binary encryption keys being assigned to a respective connection between the first user and another of the at least two users, the first logistics device being capable of assigning the respective one of the plurality of additional random binary encryption keys to the respective connection.

20. The encryption system as recited in claim 13 wherein one of the random binary encryption key and parts of the random binary encryption key is used only once.

* * * * *